United States Patent
Ramb et al.

(10) Patent No.: US 9,308,576 B2
(45) Date of Patent: Apr. 12, 2016

(54) METHOD FOR MANUFACTURING A TURBOCHARGER WITH VARIABLE TURBINE GEOMETRY

(75) Inventors: Thomas Ramb, Worms (DE); Uwe Knauer, Worms (DE); Leif Heidingsfelder, Ramstein (DE); Urban Radke, Bruchmuehlbach-Miesau (DE)

(73) Assignee: BorgWarner Inc., Auburn Hills, MI (US)

(*) Notice: Subject to any disclaimer, the term of this patent is extended or adjusted under 35 U.S.C. 154(b) by 575 days.

(21) Appl. No.: 13/825,021

(22) PCT Filed: Sep. 22, 2011

(86) PCT No.: PCT/US2011/052690
§ 371 (c)(1),
(2), (4) Date: Mar. 19, 2013

(87) PCT Pub. No.: WO2012/047527
PCT Pub. Date: Apr. 12, 2012

(65) Prior Publication Data
US 2013/0180106 A1    Jul. 18, 2013

(30) Foreign Application Priority Data

Sep. 27, 2010 (DE) .......................... 10 2010 046 658

(51) Int. Cl.
*B21K 3/00* (2006.01)
*F01D 17/16* (2006.01)
*F02B 37/24* (2006.01)

(52) U.S. Cl.
CPC .............. *B21K 3/00* (2013.01); *F01D 17/165* (2013.01); *F02B 37/24* (2013.01); *F05D 2220/40* (2013.01); *Y02T 10/144* (2013.01); *Y10T 29/49243* (2015.01)

(58) Field of Classification Search
CPC ... F01D 17/165; F02B 37/24; F05D 2220/40; Y10T 29/49243; Y02T 10/144; B21K 3/00
See application file for complete search history.

(56) References Cited

U.S. PATENT DOCUMENTS

| | | | |
|---|---|---|---|
| 7,507,067 B2* | 3/2009 | Boening | F01D 17/165 415/134 |
| 7,886,536 B2* | 2/2011 | Hemer | F01D 17/165 415/159 |

(Continued)

*Primary Examiner* — Ryan J Walters
(74) *Attorney, Agent, or Firm* — A. Michael Tucker; Stephan A. Pendorf; Patent Central LLC

(57) ABSTRACT

A method for manufacturing a turbocharger (1) with variable turbine geometry (VTG), having a turbine housing (2) with a feed duct (9) for exhaust gases; a turbine rotor (4) which is rotatably mounted in the turbine housing (2); and a guide grate (18) which surrounds the turbine rotor (4) radially at the outside, which has a blade bearing ring (6), which has a multiplicity of guide blades (7) which have in each case one blade shaft (8) mounted in the blade bearing ring (6), which has an adjusting ring (5) operatively connected to the guide blades (7) via associated blade levers (20) fastened to the blade shafts (8) at one of the ends thereof, each blade lever (20) having at the other end a lever head (23) which can be placed in engagement with an associated engagement recess (24) of the adjusting ring (5), and which has a stop (25) at least for setting the minimum throughflow through the nozzle cross sections formed by the guide blades (7). The stop (25) is formed as a setting pin which is fastened by means of an automated butt welding process, the position of the setting pin being determined from a previously carried out throughflow measurement with similar guide grates.

15 Claims, 3 Drawing Sheets

(56) References Cited

U.S. PATENT DOCUMENTS

Figure 1:
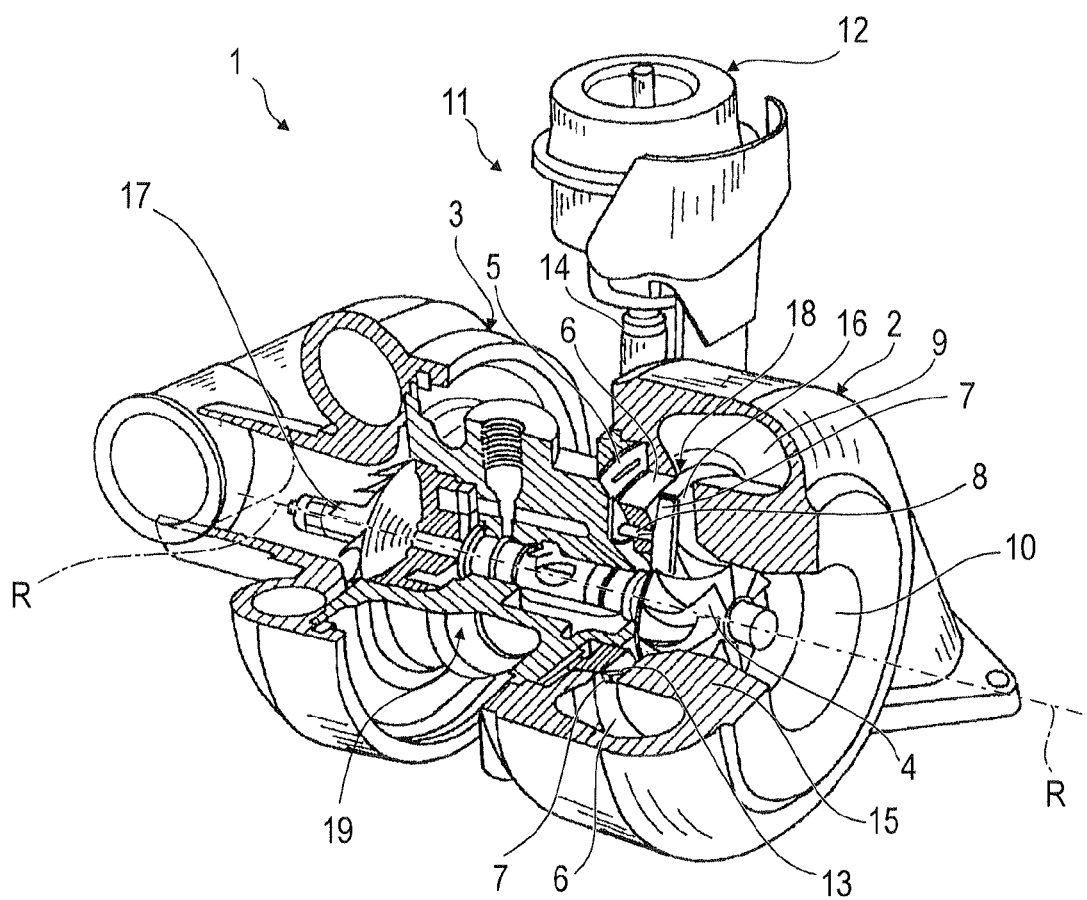

| | | | |
|---|---|---|---|
| 8,328,520 B2 * | 12/2012 | Boening | F01D 17/165 416/160 |
| 8,545,173 B2 * | 10/2013 | Valin | F01D 17/165 415/164 |
| 8,764,389 B2 * | 7/2014 | Boening | F01D 17/165 415/164 |
| 8,992,166 B2 * | 3/2015 | Ramb | F01D 17/165 415/159 |
| 2009/0067996 A1 * | 3/2009 | Tries | F01D 17/165 415/173.1 |

* cited by examiner

METHOD FOR MANUFACTURING A TURBOCHARGER WITH VARIABLE TURBINE GEOMETRY

The invention relates to a method for manufacturing a turbocharger.

A known turbocharger is described in EP 1 564 380 A1. To avoid weakening of the adjusting ring, said document proposes a stop which is integrally connected to the adjusting ring and which is composed of a web, the width of which may be varied or which may be provided with an adjustable grub screw. Said design duly yields, to a certain extent, the possibility of an adjustable stop, but a stop constructed in this way would in practice be almost impracticable because firstly the spatial conditions the insertion of a grub screw, which moreover would require the provision of an internal thread in the single-piece stop part, and moreover it would be necessary for a locking facility for the grub screw to be provided in order to be able to fix the setting carried out. On account of the extremely restricted spatial conditions, this is in reality associated with a high level of expenditure, and is therefore not desirable.

In the known turbocharger, however, as a result of the fact that the stop is integrally formed on the adjusting ring, it is possible only with a relatively high level of expenditure, if at all, for the projection of the stop to be reworked after the assembly of the guide grate, for example if it is intended or necessary to carry out a correction of the end positions of the guide grate.

It is therefore an object of the present invention to provide a method for manufacturing a turbocharger with variable turbine geometry (VTG) specified in the preamble of claim 1, which method permits a simplification of the assembly of the guide grate or guide apparatus through automation, wherein simple and therefore cost-effective and also precise adjustment of the throughflow region should be possible by means of online information feedback from the throughflow measurement of the guide apparatus.

In this way, it is achieved that a limitation of the mass flows of the variable turbine geometry (VTG) can be attained in a simple manner by means of a stop pin. Here, if it is sought to attain a limitation both of the minimum throughflow and also of the maximum throughflow, two such setting pins or stop pins are provided which can preferably be butt-welded to the blade bearing ring in an automated fashion. Very precise setting of the mass flows is therefore possible because the setting pins may be positioned as desired, and said pins are captively connected to the blade bearing ring after the fixing takes place. In the case of automated welding, the position of the setting pins may be determined by iteration and comparison with the last used position. This assumes that the cartridges welded in the production process directly subsequently undergo a throughflow measurement and a throughput deviation is incorporated in an online manner as a corrective variable in the positioning of the setting pins. The required throughputs may therefore be adapted, in accompaniment with the process. in each cartridge or each guide grate. According to the invention, therefore, a very precise, permanently set cartridge or guide grate is produced.

According to the invention, an automated method is consequently realized which comprises online throughput measurements in the production process and which therefore allows conclusions to be drawn regarding the quality of the positioning of the one or more stops. The method according to the invention can therefore approximate iteratively to the desired throughput. The fastening of the stop pin preferably takes place in an automated fashion, that is to say the positions used are stored and provided as a comparison for subsequent positioning processes. The fastening of the stops may be possible at any desired locations, and is not known in advance of the method according to the invention. A butt-welding process is preferably used for the fastening. According to the invention, fully welded guide grates which do not have the desired throughput are treated as rejects.

It is possible in principle for the stop to be fixed either to the blade bearing ring, which is stationary in the housing, or to the movable adjusting ring. In a manner dependent thereon, the projection of the stop then interacts either with the counterpart stop surfaces of the adjusting ring or with the fastening rings of the blade levers.

A further resulting advantage is that the entire guide apparatus can be completely preassembled as a cartridge and the minimum throughflow can be set before said guide apparatus is then placed into the turbine housing.

The setting of the minimum throughflow and, if appropriate, of the maximum throughflow therefore takes place independently of the turbine housing and other components of the turbocharger, such as for example the bearing housing. Also, the connecting pipe position between the bearing housing and turbine housing no longer has an influence on the minimum throughflow setting. Likewise, wear of the adjusting lever and the point at which said adjusting lever engages on the adjusting ring do not have an effect on the minimum throughflow rate.

Figure 2:
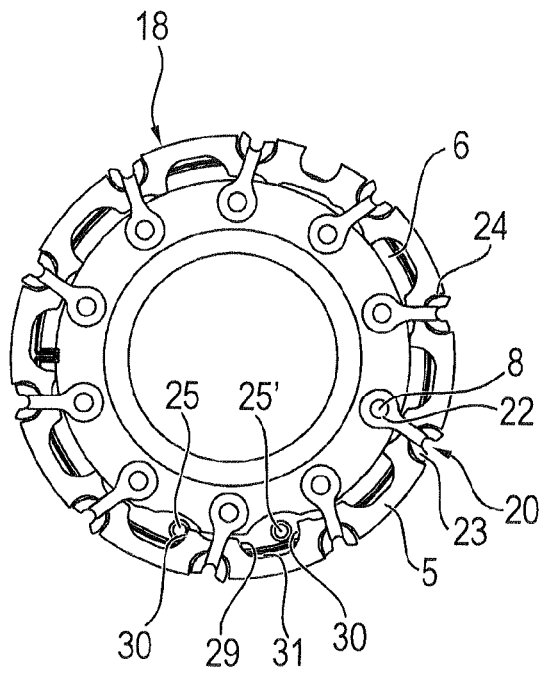
Figure 3:
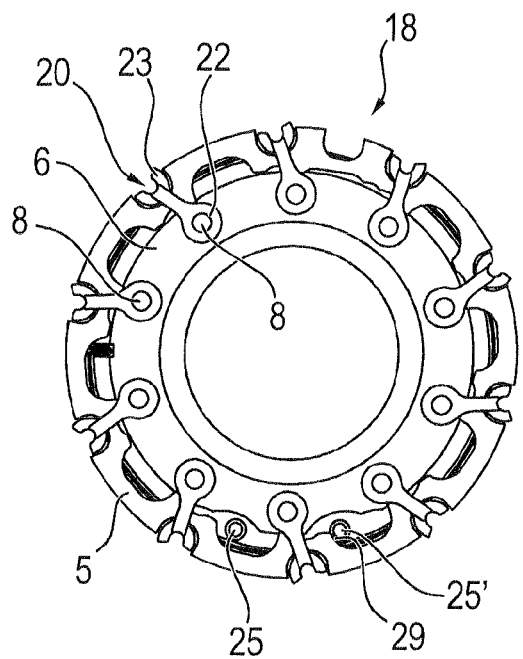
Figure 4:
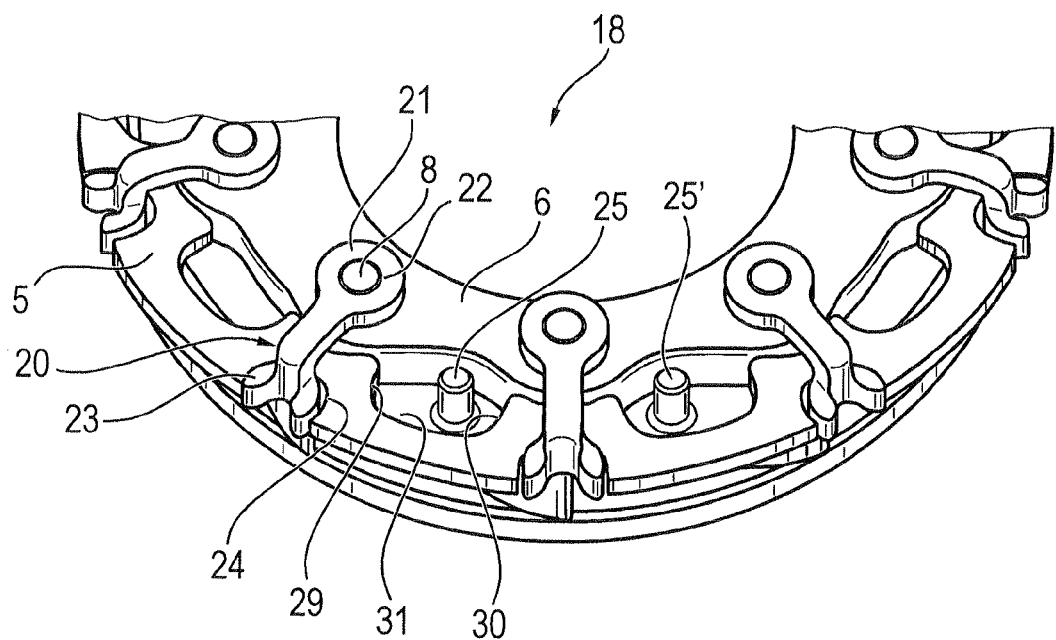
Figure 6:
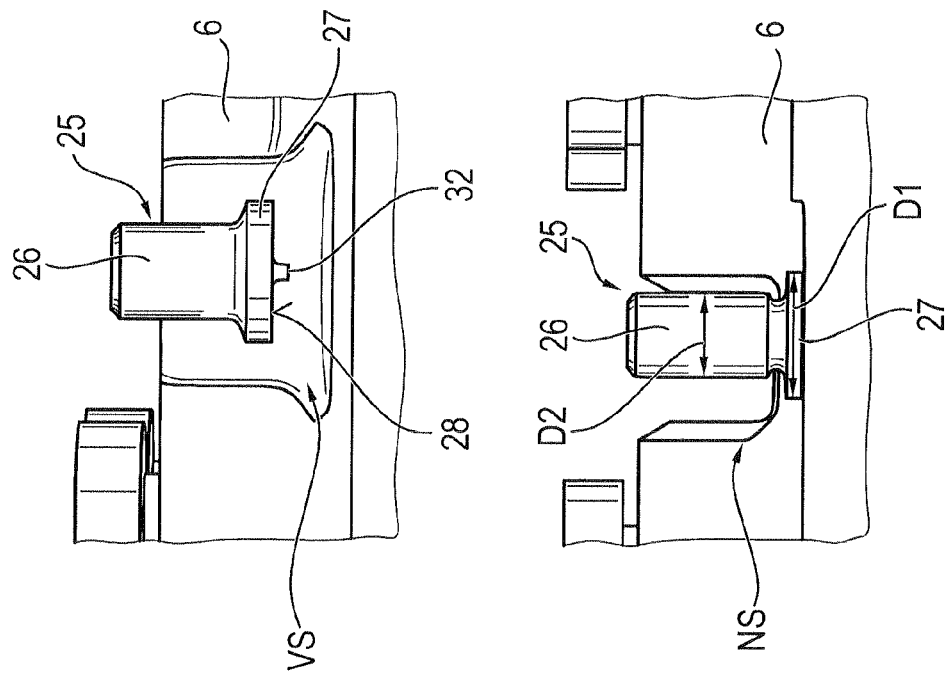
Figure 5:
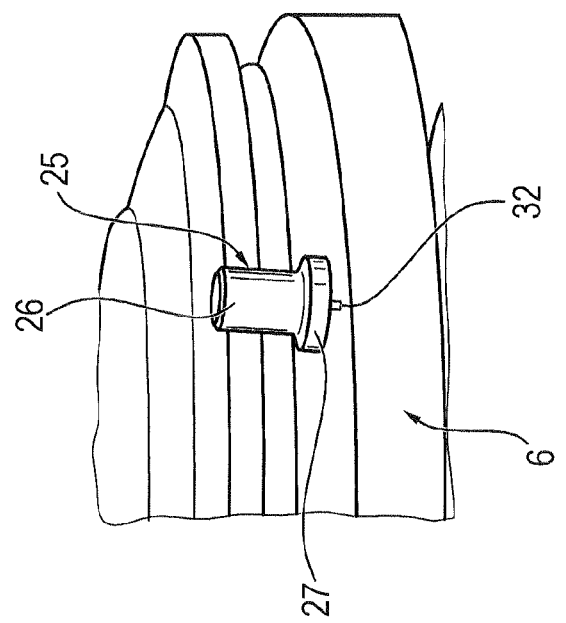

Further details, advantages and features of the invention will emerge from the following description of an exemplary embodiment on the basis of the drawing, in which:

FIG. 1 shows a sectional perspective illustration of the basic design of a turbocharger according to the invention, FIGS. 2 and 3 show plan views of the guide grate according to the invention, FIG. 4 shows a partial view of the guide grate according to the invention, and FIGS. 5 and 6 show partial views of the blade bearing ring and a setting pin according to the invention in different stages of assembly.

FIG. 1 illustrates a turbocharger I according to the invention which has a turbine housing 2 and, connected thereto via a bearing housing 19, a compressor housing 3. The housings 2, 3 and 19 are arranged along an axis of rotation R. The turbine housing 2 is shown partially in section in order to illustrate the arrangement of a blade bearing ring 6 as part of a radially outer guide grate 18 which has a multiplicity of guide blades 7 which are distributed over the circumference and which have pivot axles or blade shafts 8. In this way, nozzle cross sections are formed which are larger or smaller depending on the position of the guide blades 7 and via which the turbine rotor 4 mounted in the center on the axis of rotation R is acted on to a greater or lesser extent with the exhaust gas of an engine, which exhaust gas is supplied via a feed duct 9 and discharged via a central connecting piece 10, in order via the turbine rotor 4 to drive a compressor rotor 17 seated on the same shaft.

An actuating device 11 is provided for controlling the movement or the position of the guide blades 7. Said actuating device may be of any desired design, but a preferred embodiment has a control housing 12 which controls the control movement of a plunger element 14 fastened thereto, in order to convert the movement of said plunger element into a slight rotational movement of an adjusting ring 5 situated behind the blade bearing ring 6. A free space 13 for the guide blades 7 is formed between the blade bearing ring 6 and an annular part 15 of the turbine housing 2. To be able to safeguard said free space 13, the blade bearing ring 6 has integrally formed spacers 16. In the example, three spacers 16 are arranged on the circumference of the blade bearing ring 6 at angular intervals of in each case 120°. It is however possible in principle for more or fewer such spacers 16 to be provided.

FIGS. 2 and 3 show plan views, and FIG. 4 shows a partial view, of an embodiment of the guide grate 18 according to the invention on an enlarged scale.

Illustrated representatively of all the blade levers of said guide grate 18 is in each case one blade lever 20 which, at one end, has a fastening ring 21 with a recess 22 in which one end of the blade shaft 8 is fixed.

A lever head 23 of the blade lever 20 is arranged in an engagement recess 24 of the adjusting ring 5 and is therefore in engagement with the adjusting ring 5.

Furthermore, FIGS. 2 to 4 show the arrangement of two stops 25, 25' in each case in the form of a setting pin.

As shown in FIGS. 2 to 4, in the example, two setting pins 25 and 25' are fixed to the blade bearing ring 6. Here, FIG. 2 shows the adjusting ring of the VTG in the maximum load position of an internal combustion engine equipped with the exhaust-gas turbocharger according to the invention. In said position, the guide blade ring of the VTG is opened to the greatest possible extent. Here, the adjusting ring 5 of the VTG bears with the stop cam or the flank 30 against the setting pin 25 (max stop pin) which limits the further adjustment travel.

FIG. 3, in contrast, shows the guide grate 18 in the minimum position. The guide blade ring is closed to the greatest possible extent and accordingly bears with a stop cam or a flank 29 against the setting pin 25'.

FIG. 4 furthermore shows a partial section of the guide grate 18 according to the invention on an enlarged scale in order to illustrate the components described above.

FIGS. 5 and 6 show, on an enlarged scale, a part of the blade bearing ring 6 with the setting pin 25, the design of which is identical to the setting pin 25'.

Accordingly, the setting pins 25, 25' have in each case a cylindrical stop shank 26 which is provided with an integral support plate 27. As shown in particular in FIG. 6, the diameter D1 of the support plate 27 is larger than the diameter D2 of the stop shank 26.

The support plate 27 also has a lower support surface 28 which, in the assembled state, rests on the blade bearing ring 6. In the example, a latching peg 32 is arranged centrally on the support surface 28, which latching peg 32 ensures a defined initial contact of the setting pin for the electrical current profile during the butt welding process.

FIG. 5 and the upper part of FIG. 6 (denoted by the arrow VS) illustrate the assembled state of the setting pin 25 before it is welded to the blade bearing ring 6, such that the latching peg 32 is visible only in these figures.

The lower part of FIG. 6 (denoted by the arrow NV) shows the state after the welding process, in which the setting pin 25 has been captively connected to the blade bearing ring 6 at the predetermined location.

To supplement the disclosure, reference is explicitly made to the diagrammatic illustration of the invention in FIGS. 1 to 6.

LIST OF REFERENCE NUMERALS

1 Turbocharger
2 Turbine housing
3 Compressor housing
4 Turbine rotor/turbine wheel
5 Adjusting ring
6 Blade bearing ring
7 Guide blades
8 Blade shaft
9 Feed duct
10 Axial connecting piece
11 Actuating device
12 Control housing
13 Free space for guide blades 7
14 Plunger element
15 Annular part of the turbine housing 2
16 Spacer/spacer cam
17 Compressor rotor/compressor wheel
18 Guide grate/guide apparatus
19 Bearing housing
20 Blade lever
21 Fastening ring
22 Recess
23 Lever head
24 Engagement recesses
25 Stop/setting pin
26 Stop shank
27 Support plate
28 Contact surface
29, 30 Stop cam/flanks
31 Groove
32 Latching peg

The invention claimed is:

1. A method for manufacturing a turbocharger (1) with variable turbine geometry (VTG), the method comprising:
manufacturing the turbocharger comprising: a turbine housing (2) with a feed duct (9) for exhaust gases;
a turbine rotor (4) rotatably mounted in the turbine housing (2); and a guide grate (18) which radially surrounds the turbine rotor (4), the guide grate comprising: a blade bearing ring (6), a multiplicity of guide blades (7) each having a blade shaft (8) mounted in the blade bearing ring (6), an adjusting ring (5) operatively connected to the guide blades (7) via associated blade levers (20) fastened to the blade shafts (8) at one of the ends thereof, each blade lever (20) having at the other end a lever head (23) which can be placed in engagement with an associated engagement recess (24) of the adjusting ring (5), and a stop (25) for setting a minimum throughflow through nozzle cross sections formed by the guide blades (7),
wherein the stop (25) is a setting pin which is fastened by means of an automated butt welding process, a position of the setting pin being determined from iterative throughflow measurements.

2. The method as claimed in claim 1, wherein the setting pin (25) is provided with a cylindrical stop shank (26) which is adjoined by a support plate (27).

3. The method as claimed in claim 2, wherein the support plate (27) is manufactured with a diameter (D1) which is greater than or equal to the diameter (D2) of the stop shank (26).

4. The method as claimed in claim 2, wherein the support plate (27) is provided, on its support surface (28), with a latching peg (32).

5. The method as claimed in claim 1, wherein the setting pin (25) is formed as a welded pin.

6. The method as claimed in claim 5, wherein the setting pin (25) is butt-welded to the blade bearing ring (6).

7. The method as claimed in claim 1, wherein two setting pins (25, 25') are provided, one (25) of which serves to set the maximum position and the other (25') of which serves to set the minimum position of the guide grate (18).

8. A method for manufacturing a guide grate (18) for a turbocharger (1) with variable turbine geometry (VTG), which guide grate (18) radially surrounds a turbine rotor (4) of the turbocharger (1) the method comprising:

manufacturing the guide grate comprising:

a blade bearing ring (6), a multiplicity of guide blades (7) each having a blade shaft (8) mounted in the blade bearing ring (6), an adjusting ring (5) operatively connected to the guide blades (7) via associated blade levers (20) fastened to the blade shafts (8) at one of the ends thereof, each blade lever (20) having at the other end a lever head (23) which can be placed in engagement with an associated engagement recess (24) of the adjusting ring (5), and a stop (25) for setting a minimum throughflow through nozzle cross sections formed by the guide blades (7), wherein the stop (25) is formed as a setting pin which is fastened by means of an automated butt welding process, a position of the setting pin being determined from iterative throughflow measurements.

9. The method as claimed in claim 8, wherein the setting pin (25) is provided with a cylindrical stop shank (26) which is adjoined by a support plate (27).

10. The method as claimed in claim 9, wherein the support plate (27) is manufactured with a diameter (D1) which is greater than or equal to a diameter (D2) of the stop shank (26).

11. The method as claimed in claim 9, wherein the support plate (27) is provided, on a support surface (28), with a latching peg (32).

12. The method as claimed in claim 8, wherein the setting pin (25) is formed as a welded pin.

13. The method as claimed in claim 12, wherein the setting pin (25) is butt-welded to the blade bearing ring (6).

14. The method as claimed in claim 8, wherein two setting pins (25, 25') are provided, one (25) of which serves to set the maximum position and the other (25') of which serves to set the minimum position of the guide grate (18).

15. A method for manufacturing a stop of a guide grate (18) for a turbocharger (1) with variable turbine geometry (VTG), which guide grate (18) radially surrounds a turbine rotor (4) of the turbocharger (1)

the guide grate comprising: a blade bearing ring (6), a multiplicity of guide blades (7) each having a blade shaft (8) mounted in the blade bearing ring (6), an adjusting ring (5) operatively connected to the guide blades (7) via associated blade levers (20) fastened to the blade shafts (8) at one of the ends thereof, each blade lever (20) having at the other end a lever head (23) which can be placed in engagement with an associated engagement recess (24) of the adjusting ring (5), the method comprising: forming the stop (25) as a setting pin which is fastened by means of an automated butt welding process, wherein a position of the setting pin is determined from iterative throughflow measurements.

* * * * *